United States Patent
Chai et al.

(10) Patent No.: US 12,008,081 B2
(45) Date of Patent: Jun. 11, 2024

(54) IMAGE COLLECTION AND LABELLING USING COMPUTER SYSTEM AND ANALYSIS

(71) Applicant: International Business Machines Corporation, Armonk, NY (US)

(72) Inventors: Tian Tian Chai, Beijing (CN); Hong Bing Zhang, Beijing (CN); Kun Yan Yin, Ningbo (CN); Miao Guo, Beijing (CN); Yu Luo, Beijing (CN); Yun Jing Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 17/303,086

(22) Filed: May 19, 2021

(65) Prior Publication Data

US 2022/0374652 A1  Nov. 24, 2022

(51) Int. Cl.
*G06F 18/40* (2023.01)
*G06F 18/214* (2023.01)
(Continued)

(52) U.S. Cl.
CPC ............ *G06F 18/40* (2023.01); *G06F 18/214* (2023.01); *G06T 7/246* (2017.01); *G06T 11/203* (2013.01); *G06V 20/46* (2022.01); *G06V 40/28* (2022.01); *G06N 20/00* (2019.01); *G06T 2207/10016* (2013.01); *G06T 2207/20081* (2013.01); *G06T 2207/20104* (2013.01)

(58) Field of Classification Search
CPC ....... G06F 18/40; G06F 18/214; G06T 7/246; G06T 11/203; G06T 2207/10016; G06T 2207/20081; G06T 2207/20104; G06T 2200/24; G06T 11/60; G06V 20/46; G06V 40/28; G06N 20/00
See application file for complete search history.

(56) References Cited

U.S. PATENT DOCUMENTS 10,629,166 B2  4/2020  Boyce
2015/0056360 A1  2/2015  Beeson
(Continued)

FOREIGN PATENT DOCUMENTS

CN  108491081 A  9/2018
WO  2020174447 A1  9/2020

OTHER PUBLICATIONS

"Real-Time Learning with Augmented Reality (AR) Assistance", An IP.com Prior Art Database Technical Disclosure, Disclosed Anonymously, IP.com No. IPCOM000260175D, IP.com Electronic Publication Date: Oct. 28, 2019, 4 pages.
(Continued)

*Primary Examiner* — Said Broome
*Assistant Examiner* — Andrew Shin
(74) *Attorney, Agent, or Firm* — Michael A. Petrocelli (57) ABSTRACT

A method, a computing system and a computer program product for collecting and labelling images includes capturing a video of an object with a camera. A movement trace of a pointer is recorded that outlines the object while capturing the video of the object. Further included is generating a labeled image based at least on the captured video of the object and the recorded movement trace of the pointer. The labeled image includes the object and a line that surrounds the object.

20 Claims, 8 Drawing Sheets

(51) Int. Cl.
*G06N 20/00* (2019.01)
*G06T 7/246* (2017.01)
*G06T 11/20* (2006.01)
*G06V 20/40* (2022.01)
*G06V 40/20* (2022.01)

(56) References Cited

U.S. PATENT DOCUMENTS

| | | | |
|---|---|---|---|
| 2016/0070688 A1* | 3/2016 | Yao | G06F 40/169 |
| | | | 715/232 |
| 2017/0055663 A1 | 3/2017 | Hodges | |
| 2018/0040133 A1* | 2/2018 | Srinivasan | H04N 19/43 |
| 2019/0019335 A1 | 1/2019 | Elangovan | |
| 2019/0130219 A1* | 5/2019 | Shreve | G06F 18/2148 |
| 2020/0151448 A1* | 5/2020 | Lin | G06V 20/64 |
| 2022/0124128 A1* | 4/2022 | Port | G06V 20/49 |

OTHER PUBLICATIONS

Mell, et al., "The NIST Definition of Cloud Computing", National Institute of Standards and Technology, Special Publication 800-145, Sep. 2011, 7 pages.

Simonyan et al., "Two-Stream Convolutional Networks for Action Recognition in Videos", arXiv:1406.2199v2, Nov. 12, 2014, 11 pages.

Zhang et al., "Intent Recognition in Smart Living Through Deep Recurrent Neural Networks", arXiv:1702.06830v3, Aug. 16, 2017, 11 pages.

* cited by examiner

IMAGE COLLECTION AND LABELLING USING COMPUTER SYSTEM AND ANALYSIS

BACKGROUND

The present disclosure relates to image collection and labelling, and more specifically, to generating a labeled image based on a captured video.

Image collection and labelling is a step in Artificial Intelligence (AI) vision model training. Taking vehicle parts classification as an example, currently the process of collecting and labeling images for training is started by a user taking images of the vehicle parts on site, such as in a vehicle parts factory. Then, the images are uploaded to a labelling tool, which is used by data scientists to identify and label the vehicle parts in the images. In one example, continuing with the example above, there is a lack of information regarding the vehicle parts, thus making labeling of the vehicle parts difficult, for instance for a data scientist.

The current image collection and labelling process is complex, time-consuming and provides poor user experience.

SUMMARY

According to an embodiment of the invention, in one example, for each vehicle part in images, a data scientist may draw a box that surrounds the vehicle part and input its part type as a label name. The labelled images may then be used to train an AI vision model for vehicle parts classification.

According to one embodiment of the present invention, a computer-implemented method is provided. The method comprises capturing a video of an object with a camera. The method further comprises recording a movement trace of a pointer that outlines the object while capturing the video of the object. The method further comprises generating a labeled image based at least on the captured video of the object and the recorded movement trace of the pointer. The labeled image includes the object and a line that surrounds the object.

According to another embodiment of the present invention, a computing system is provided. The computing system comprises a processor and a computer-readable memory unit coupled to the processor. The memory unit comprises instructions that, when executed by the processor, cause the processor to perform actions of capturing a video of an object with a camera. The memory unit further comprises instructions that, when executed by the processor, cause the processor to perform actions of recording a movement trace of a pointer while capturing the video of the object. The movement trace of the pointer outlines the object. The memory unit further comprises instructions that, when executed by the processor, cause the processor to perform actions of generating a labeled image based at least on the captured video of the object and the recorded movement trace of the pointer. The labeled image includes the object and a line that surrounds the object.

According to further embodiment of the present invention, a computer program product is provided. The computer program product comprises a computer readable storage medium having program instructions embodied therewith. The program instructions are executable by a processor to cause the processor to perform actions of capturing a video of an object with a camera. The program instructions are executable by a processor to further cause the processor to perform actions of recording a movement trace of a pointer while capturing the video of the object. The movement trace of the pointer outlines the object. The program instructions are executable by a processor to further cause the processor to perform actions of generating a labeled image based at least on the captured video of the object and the recorded movement trace of the pointer. The labeled image includes the object and a line that surrounds the object.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
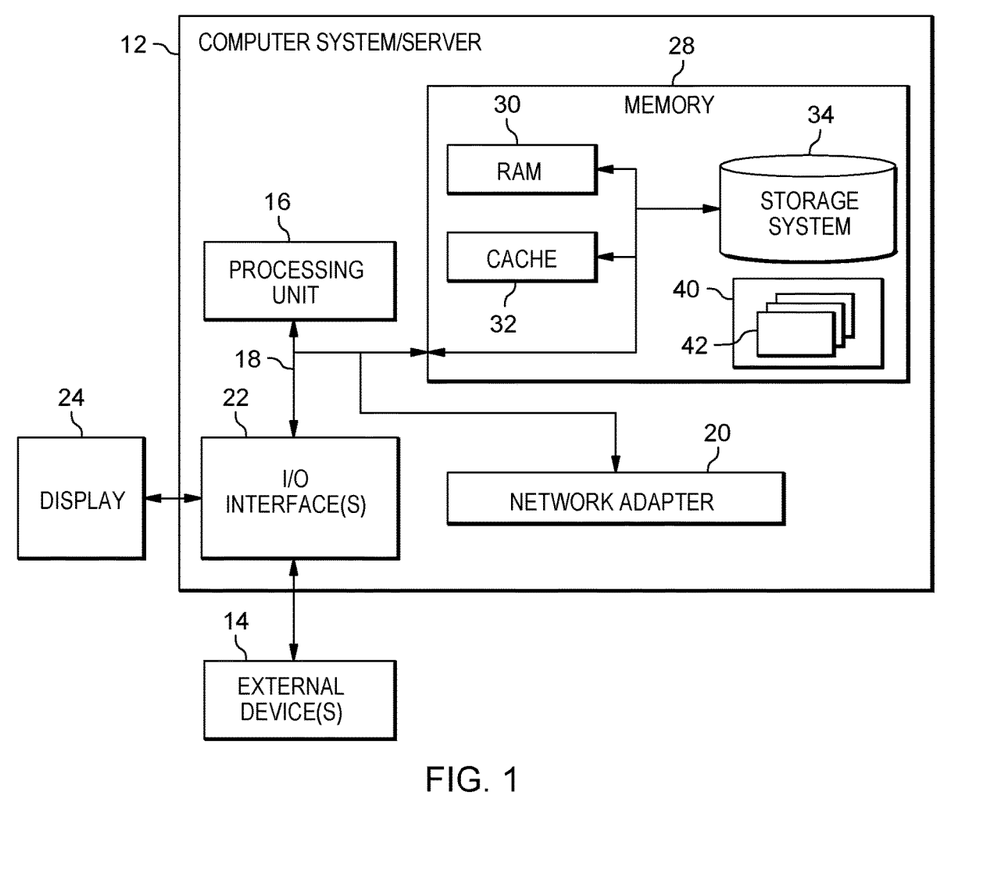
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
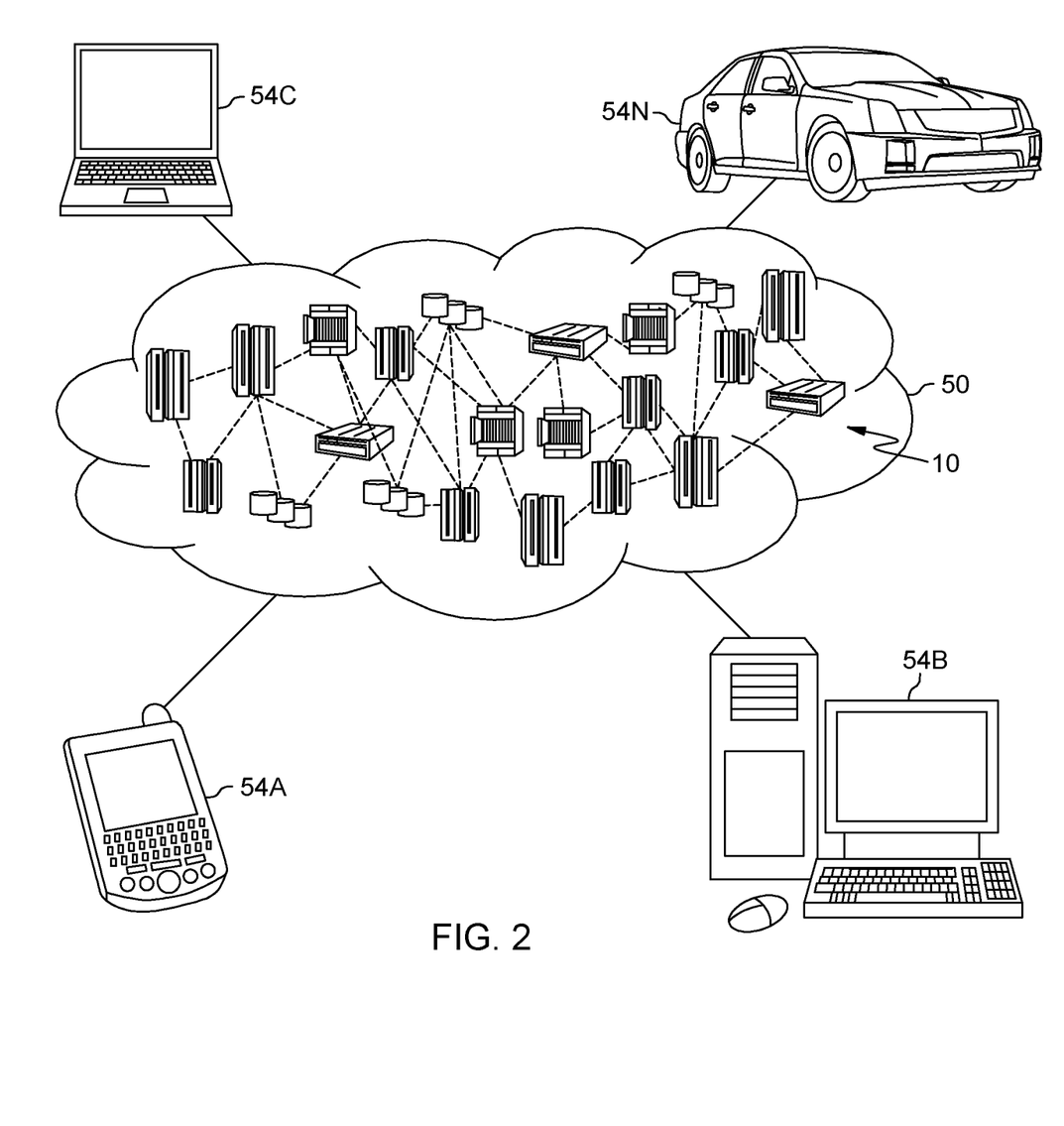
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
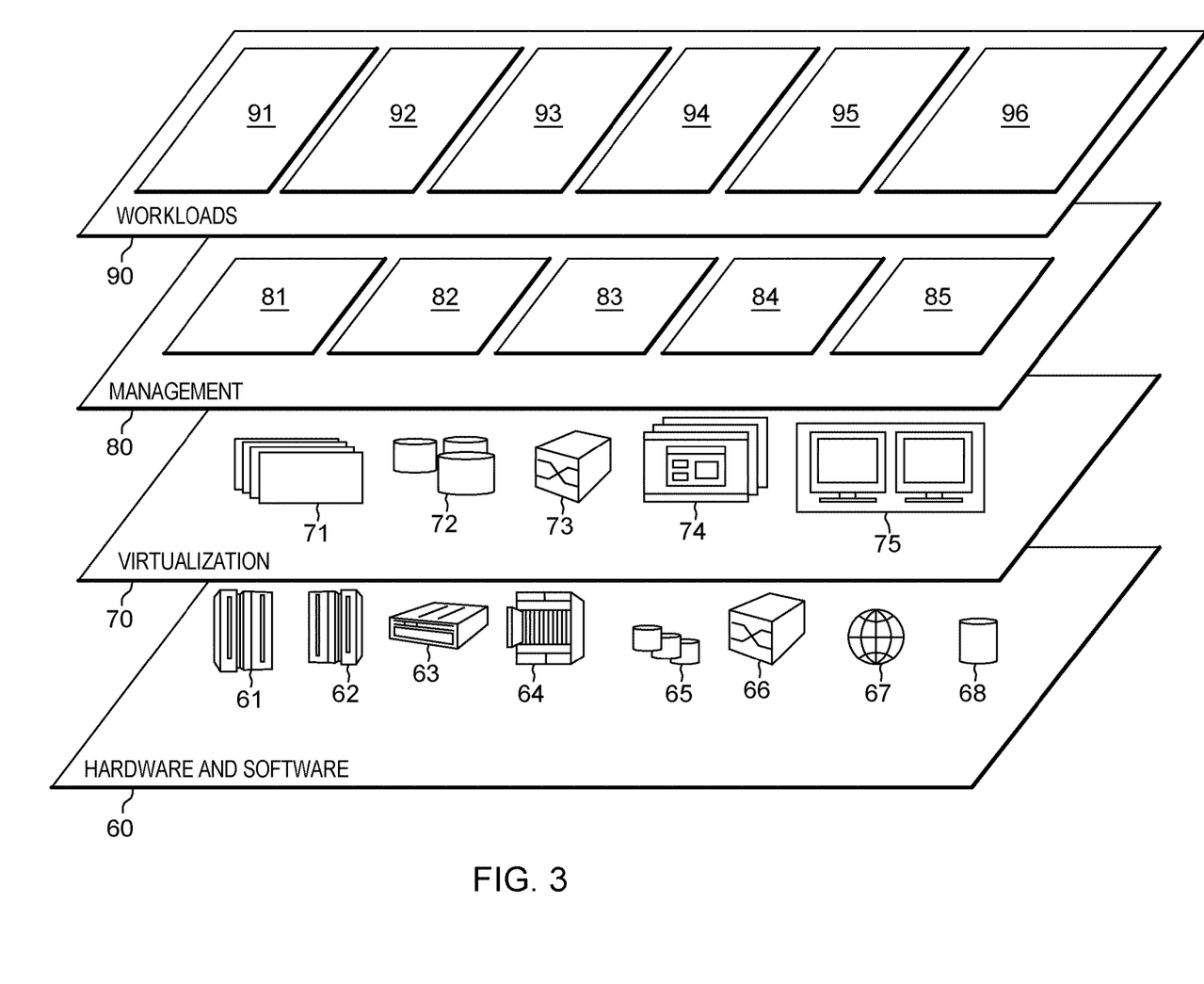
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image collection and labelling 96.

As mentioned above, the current image collection and labelling process for AI vision model training is complex, time-consuming and provides poor user experience. For example, a data scientist who labels the images may not participate in the image-taking process and have no knowledge about the vehicle parts. They generally need to communicate with the user who captures the images to learn knowledge about the vehicle parts included in the images. In other words, the user and the data scientist will have to take much time to transfer knowledge about identifying and labelling the objects in the images. Typically, a large number of labelled images are required to train an AI model, which exacerbates the situation. Moreover, most labelling tools used to label images have no intuitive user interfaces and are not easy to use, thus providing poor user experiences.

It is thus desirable to provide an improved method for image collection and labelling.

Embodiments of the present disclosure provide methods and systems with a simplified process of image collection and labelling. Moreover, good interactive experiences can be obtained according to some embodiments.

Figure 4:
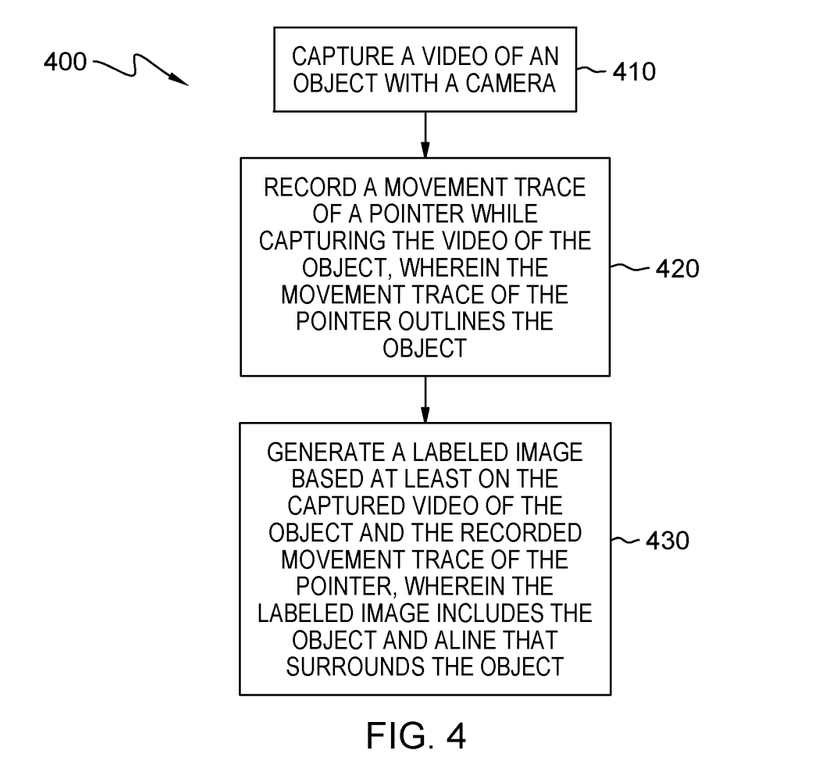
FIG. 4 is a flow chart showing an exemplary method for image collection and labelling according to an embodiment of the present invention.

With reference now to FIG. 4, FIG. 4 is a flow chart showing an exemplary method 400 for image collection and labelling according to an embodiment of the present invention. Method 400 may be performed by a computer system such as the computer system 12 shown in FIG. 1. For example, method 400 may be performed by an electronic device having a camera for capturing videos or images, or by a processor or controller that can control and communicate with a camera or the electronic device having a camera.

At block 410, a video of an object is captured with a camera. As an example, the camera may be a part of an Augmented Reality (AR) device. The object may be any object to be labeled for model training, such as a person, an animal, a car, a device, a machine part, an electronic component, and so on.

At block 420, a movement trace of a pointer, which outlines the object, is recorded while capturing the video of the object at block 410. For example, the pointer may be a finger of a user who is operating the camera, and the movement trace may be a gesture of the user. As another example, the pointer may be a pointing device that can draw lines in the space, such as a pen or a stick, and the movement trace may correspond to the gesture of the user.

According to an embodiment, the camera for capturing the video may be a part of an AR device that is able to mark the movement trace of the pointer in the captured video. For example, the user may wear AR glasses around his head and gaze at an object. The AR glasses may be turned on to capture a video of the object. While the AR glasses are capturing the video, the user may use his finger to draw a line in the space where the object is located to outline or identify the object. The AR glasses may record the movement trace of the finger along with the video. In some embodiments, the AR device may display the trace of the finger to the user in real time, such that the user may get an instant feedback of the drawing result.

At block 430, a labeled image is generated based at least on the captured video of the object and the recorded movement trace of the pointer. The labeled image may be an image frame of the captured video and may include the object and a line that surrounds the object, which is generated from the recorded movement trace of the pointer. The generated line that surrounds the object can be referred to as a label box hereinafter. For example, the label box may be a rectangle, a circle or any shape that surrounds the object to identify the object to be used as training data.

As such, the movement trace of the pointer for generating the label box of the object can be recorded at the same time while the user is using the camera to capture the video of the object, which simplifies the generation of the labeled images for training and improves the user experiences by intuitive interactions with the object.

According to an embodiment, the label name of the object can also be recorded while capturing the video of the object, which can further simplify the generation of the labeled images. For example, the user may vocally say the label name (e.g., the name, the type, or the category) of the object while recording the video of the object. The audio signal including the label name can be recorded along with video, and the label name can be extracted from the audio signal, e.g., using speech-to-text conversion. The extracted label name may then be stored as a part of the labeled image or stored in association with the labeled image, e.g., as the metadata of the image. The image of the object and the corresponding label name can be paired and used later as training data of the AI model. It should be noted that, although the label name is described above as being stored as texts, it can instead be stored as an audio signal associated with the labeled image.

The natural language processing (NLP) technique can be used in the extraction of the label name. For example, the intent recognition model can be used to recognize the intent of the audio signal and extract the label name from the audio signal if the recognized intent is to label the object. As a simple example, there may be some key words, e.g., "tag with", "label with" or "give a tag", to trigger the extraction of the label name. If the user says "give a tag 'desk'" or "label with 'desk'" when capturing the video of a desk, the label name of "desk" will be extracted and stored with the labeled image of the desk.

According to this embodiment, both the movement trace of the pointer and the extracted label name are recorded while capturing the video of the object, such that the labeled image can be easily generated by the user who takes pictures of the object on site without the help of the data scientist, which further improves the efficiency, especially when there are a large number of objects to be labeled. Moreover, the labeling can be completed by simple gestures and speeches of the user, which provides intuitive and good user experiences.

More details of the operations of method 400 will be described below in connection with FIGS. 5-10.

Figure 5:
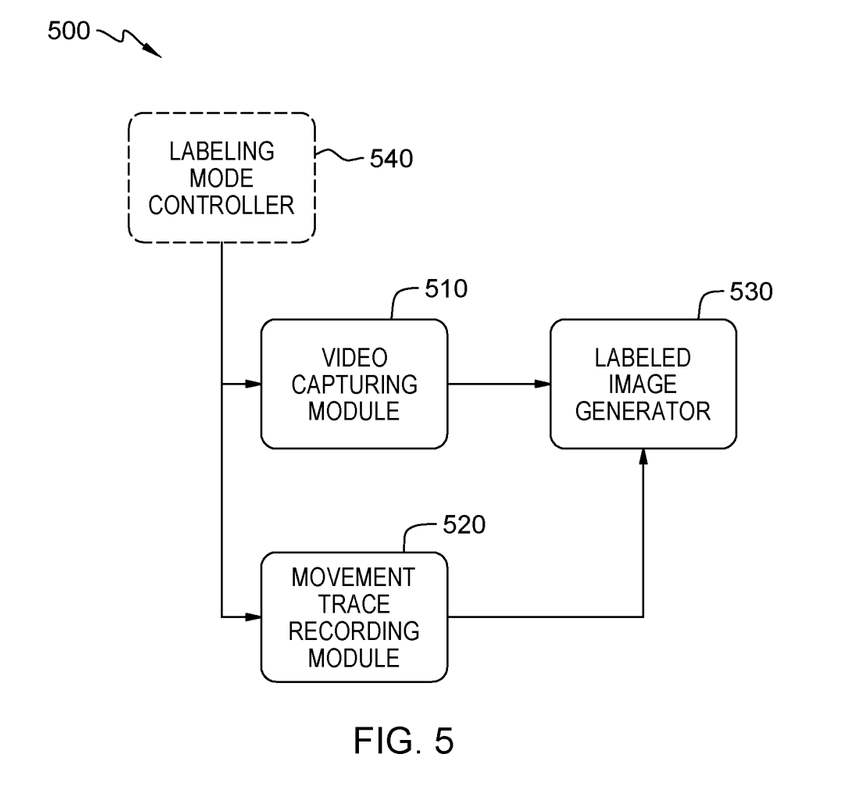
FIG. 5 shows an exemplary image collection and labelling system according to an embodiment of the present invention.

FIG. 5 shows an exemplary image collection and labelling system 500 according to an embodiment of the present invention. System 500 can be implemented as the computer system 12 of FIG. 1 and be configured to perform the methods according to the embodiments of the present disclosure, such as method 400.

As shown in FIG. 5, system 500 may include a video capturing module 510, a movement trace recording module 520 and a labeled image generator 530. The video capturing module 510 may be configured to capture the video of the object. According to an embodiment, it may be further configured to capture the audio of the user who is capturing the video. The movement trace recording module 520 may be configured to record the movement trace of a pointer, e.g., a finger of the user, while capturing the video of the object. The labeled image generator 530 may be configured to generate the labeled image, including the label box of the object, based at least on the captured video of the object and the recorded movement trace of the pointer. The generation of the label box will be described in more detail with reference to FIGS. 8-10. According to an embodiment, the labeled image generator 530 may be further configured to generate the labeled image based on the captured video, the movement trace of the pointer and also the label name extracted from the audio of the user.

According to an embodiment, system 500 may further include a labeling mode controller 540, which can control the video capturing module 510 and the movement trace recording module 520 to start and end the labeling mode. The operations of the labeling mode controller 540 will be described in more detail in connection with FIGS. 6 and 7.

Figure 6:
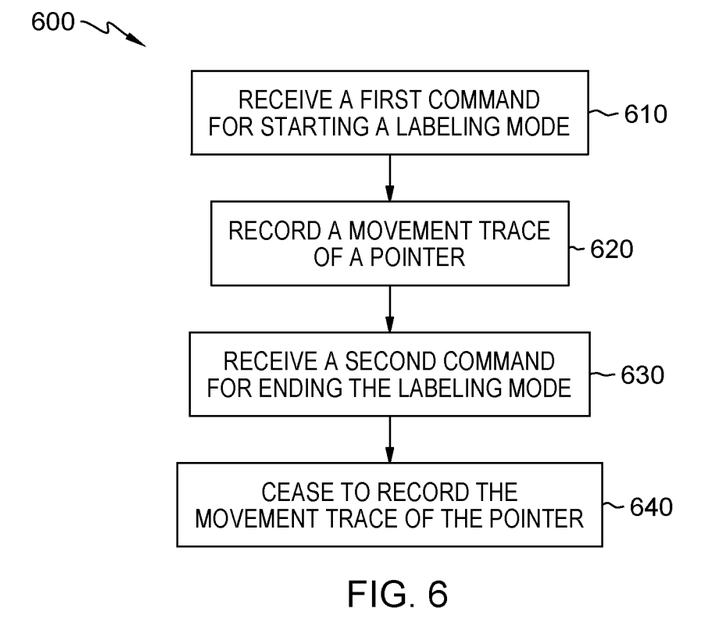
FIG. 6 is a flow chart showing an exemplary method for starting and ending a labelling mode according to an embodiment of the present invention.

FIG. 6 is a flow chart showing an exemplary method 600 for starting and ending a labelling mode according to an embodiment of the present invention. Method 600 can be performed by system 500 as shown in FIG. 5.

At block 610, system 500 may receive a first command from the user for starting a labeling mode. The first command may be an audio, a gesture and/or an input on a button. Once the labeling mode is started, system 500 may monitor and record the movement trace of the pointer, as described in connection with block 420. Moreover, once the labeling mode is started, system 500 may record the audio of the user to recognize the possible label name included in the audio.

As an example of using audio as the first command, while capturing the video of the object, the user may say "start labeling", "I want to make annotation", "change to labeling mode", or the like. The audio of the user may be recorded along with the video, and the user's intent to start the labeling mode can be recognized by extracting the audio from the video and analyzing the audio. Similar to the extraction of the label name as described above, NPL technique can be utilized to recognize the user intent to start the labeling mode.

Figure 7A:
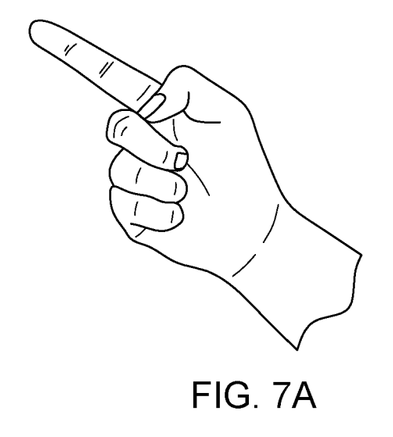
FIGS. 7A and 7B show exemplary gestures for starting and ending the labeling mode according to an embodiment of the present invention.

As an example of using gesture as the first command, while capturing the video of the object, the user may make a particular gesture to start the labeling mode. FIG. 7A shows an example gesture, using an index finger, of the user as the first command In such a case, the labeling mode controller 540 may make action recognitions in the recorded video to extract the particular gesture and identify it as the first command to start the labeling mode.

As an example of using button input as the first command, the user may press a hardware or software button on the camera or system 500 to start the labeling mode.

At block 620, in response to receiving the first command, the labeling mode controller 540 may control the movement trace recording module 520 to record the movement trace of the pointer that outlines the object. The operation at block 620 is similar to the operation at block 420 and thus is not described in detail here. According to an embodiment, in response to receiving the first command, the labeling mode controller 540 may further control the video capturing module 510 to capture the audio of the user in addition to the video of the object, for the purpose of recognizing the label name, as described above. The captured video and the possible label name will be saved in a memory, such as a video store cache, for further processing by the labeled image generator 530.

After drawing a line around the object, the user may instruct system 500 to end the labeling mode by a second command. At block 630, system 500 may receive the second command from the user to end the labeling mode. As a response, at block 640, the labeling mode controller 540 may control the movement trace recording module 520 to cease to record the movement trace of the pointer. According to an embodiment, the user may provide the second command to end the labeling mode after he said the label name of the object. Once the labeling mode is ended, system 500 may stop saving the captured video, and the labeled image generator 530 may process the saved data to generate the labeled image.

Figure 7B:
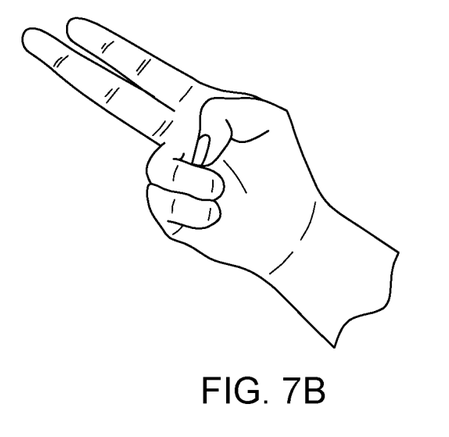

Similar to the first command, the second command may also be an audio, a gesture and/or an input on a button. As an example of audio, the user may say "finish labeling", "stop labeling", or the like. As an example of gesture, FIG. 7B shows a finger gesture, using two fingers, of the user as the second command. As an example of button input, the user may press the same button again as did for the first command to end the labeling model, or alternatively press a different button to end the labeling model.

As described with respect to FIG. 4, the movement trace of the pointer is recorded while capturing the video of the object. The drawing of the movement trace by the pointer may last a period of time, e.g., several seconds, and the captured video during this period may include a plurality of image frames each having a corresponding trace point along the movement trace. Since only one labeled image will be generated from the video captured during this period, one image frame may be selected from the plurality of image frames contained in the video and be processed to add the label box surrounding the object. The selected image frame may be any one of the plurality of image frames contained in the video. Considering that the camera for capturing the video may slightly shift or shake during the period of drawing the line around the object, the trace points in the image frames may need adjustment to generate the label box of the object in the selected image frame to be labeled. In brief, the adjustment may be performed by using the object in each image frame as the reference. More details of the adjustment will be described below with respect to FIGS. 8 and 9.

Figure 8:
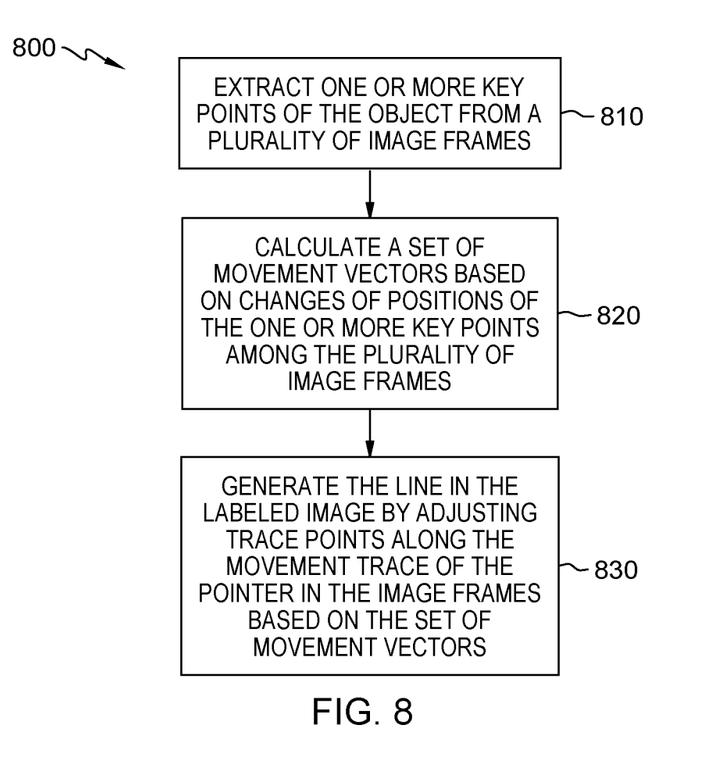
FIG. 8 is a flow chart showing an exemplary method for generating a line that surrounds an object in a labelled image according to an embodiment of the present invention.

FIG. 8 shows an exemplary process 800 for generating a line that surrounds an object, i.e., the label box, based on the movement trace of the pointer according to an embodiment of the present invention.

Figure 9A:
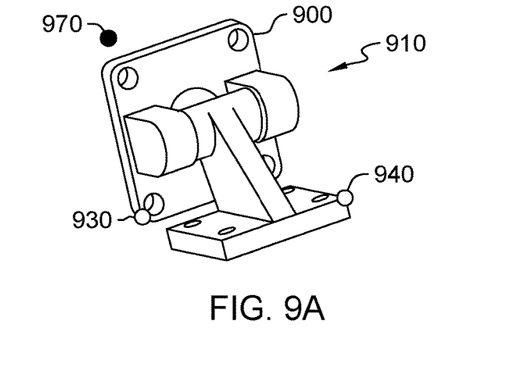
FIG. 9A, 9B, 9C show an exemplary process for generating a line that surrounds an object in a labelled image according to an embodiment of the present invention.

At block 810, one or more key points of the object are extracted from the plurality of image frames. The key points of the object may help identify the object in the image frames. For example, the key points may be those points that are very prominent and will not change due to lighting, affine transformation, noise and other factors, such as corner points, edge points, bright spots in dark areas and dark spots in bright areas. The key points of the object may be extracted using, e.g., Scale-Invariant Feature Transform (SIFT) algorithm or any other appropriate algorithms for key point extraction. FIG. 9A shows two example key points 930 and 940 of the object 900 in the image frame 910, both of which are corner points. The shift or shake of the camera can then be compensated for by tracking the movements of the key points among the image frames.

Figure 9B:
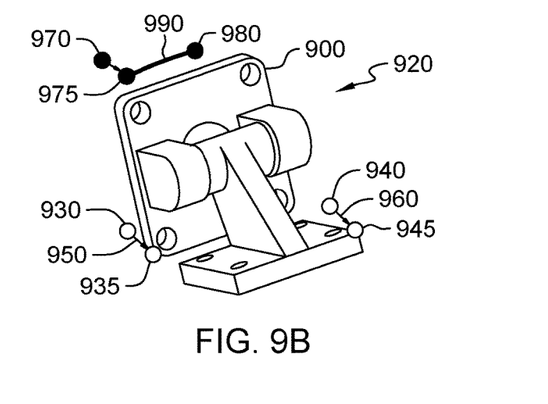

At block 820, a set of motion vectors is calculated based on changes of positions of the one or more key points among the plurality of image frames. As an example, FIG. 9A shows the key points 930 and 940 of the object 900 in image frame 910, and FIG. 9B shows the matching key points 935 and 945 of the object 900 in the subsequent image frame 920. Key points 935 and 945 have different positions from key points 930 and 940 on the image frame because the image frame 920 is shifted relative to the image frame 910. FIG. 9B also shows the respective motion vectors 950 and 960 calculated based on the position changes of the matching key points between the image frames 910 and 920. It should be noted that, in this example, the motion vectors 950 and 960 have the same direction and magnitude because the image frame 920 is simply translated relative the image frame 910. In the case where the image frame 920 is rotated relative to the image frame 910, the motion vectors of different key points may be different.

Figure 9C:
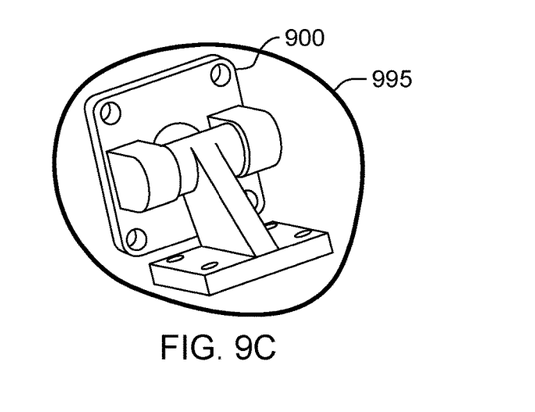

At block 830, the line surrounding the object, i.e., the label box, can be generated by adjusting trace points along the movement trace of the finger in the image frames based on the set of motion vectors. For example, FIG. 9A shows a trace point 970 drawn by the finger at the time when the image frame 910 is captured, and FIG. 9B shows another trace point 980 drawn by the finger at the time when the image frame 920 is captured. In order to compensate for the shift between the image frames 910 and 920, the position of the trace point 970 may need to be adjusted based on at least one of the motion vectors 950 and 960. For example, as shown in FIG. 9B, the trace point 970 may add the average of motion vectors 950 and 960 to get an adjusted trace point 975 in the image frame 920. Then the adjusted trace point 975, instead of the trace point 970, can be connected with the trace point 980 to form a section 990 of the label box, as shown in FIG. 9B. To form the complete label box, this process may be repeated for the subsequent image frames by adjusting the trace points in the previous image frames. In this example, by repeating the adjustment of trace points in the previous image frames, the last image frame may be used as the labeled image with a complete label box. However, it should be noted that any image frame in the captured video may be selected as the labeled image, and this image frame can be used as the reference image when calculating the motion vectors. An example of the complete label box 995 is shown in FIG. 9C. It should be noted that, although two key points of the object are used in this example, less or more key points can also be used. Moreover, although the average of the motion vectors is used to compensate for the shift in this example, one or more of the motion vectors or any of their combination can be used instead of the average of all of them.

Figure 10A:
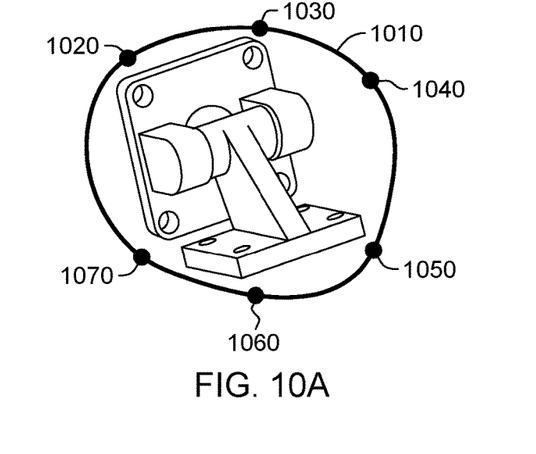
FIGS. 10A and 10B show an exemplary process for generating a minimum bounding rectangle that surrounds an object in a labelled image according to an embodiment of the present invention.
Figure 10B:
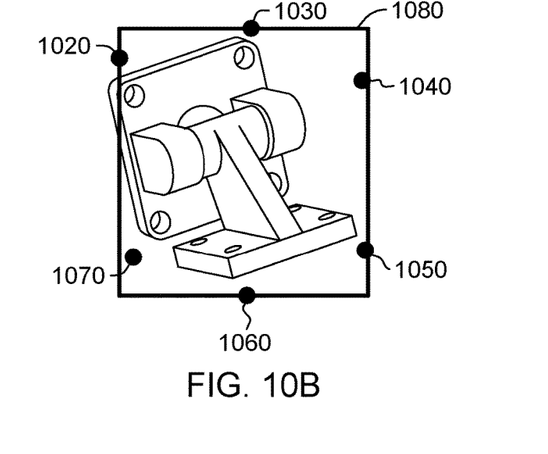

According to some embodiments, it may be preferable to use a rectangle as the label box. In such a case, the non-rectangular label box may be discretized to obtain a set of points, and a minimum bounding rectangle can be generated for the set of points, which will serve as the final label box. FIGS. 10A-10B show an example of this process.

As shown in FIG. 10A, the non-rectangular label box 1010 surrounding the object is discretized to obtain a set of points 1020, 1030, 1040, 1050, 1060 and 1070. Then as shown in FIG. 10B, a minimum bounding rectangle 1080 is generated for the set of points, and the rectangle 1080 is used as the final label box for the object.

It should be noted that the process of image collection and labelling according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   capturing, by one or more processing units, a video of an object with a camera;
   recording, by one or more processing units, a movement trace of a pointer while capturing the video of the object, wherein the movement trace of the pointer outlines the object;
   generating, by one or more processing units, a labeled image based at least on the captured video of the object and the recorded movement trace of the pointer, wherein the labeled image includes the object and a line that surrounds the object;
   the movement trace of the pointer lasting a period of time, and the captured video during the period of time including a plurality of image frames each having a corresponding trace point along the movement trace;
   selecting one image frame of the plurality of image frames of the captured video and adding a label box surrounding the object; and
   extracting a label name from audio of a user.

2. The method of claim 1, wherein the camera is a part of an Augmented Reality (AR) device that is able to mark the movement trace of the pointer in the captured video.

3. The method of claim 1, wherein the pointer includes a finger of a user or a pointing device.

4. The method of claim 1, further comprising:
   receiving, by one or more processing units, a first command for starting a labeling mode,
   wherein recording the movement trace of the pointer is started in response to receiving the first command.

5. The method of claim 4, wherein the first command comprises at least one of:
   an audio, a gesture and an input on a button.

6. The method of claim 5, wherein the audio and/or the gesture is extracted from the video.

7. The method of claim 4, further comprising:
receiving, by one or more processing units, a second command for ending the labeling mode; and
   ceasing to record, by one or more processing units, the movement trace of the pointer in response to receiving the second command.

8. The method of claim 1, further comprising:
   recording, by one or more processing units, an audio signal including a label name corresponding to the object while capturing the video of the object; and
   extracting, by one or more processing units, the label name from the audio signal,
   wherein the labeled image further includes the extracted label name corresponding to the object.

9. The method of claim 1, wherein the captured video comprises a plurality of image frames, and wherein generating the labeled image comprises:
   extracting, by one or more processing units, one or more key points of the object from the plurality of image frames;
   calculating, by one or more processing units, a set of motion vectors based on changes of positions of the one or more key points among the plurality of image frames; and
   generating, by one or more processing units, the line in the labeled image by adjusting trace points along the movement trace of the pointer in the plurality of image frames based on the set of motion vectors.

10. The method of claim 1, further comprising:
   discretizing, by one or more processing units, the line that surrounds the object to obtain a set of points on the line; and
   generating, by one or more processing units, a minimum bounding rectangle for the set of points.

11. A computing system, comprising:
a processor;
   a computer-readable memory unit coupled to the processor, the memory unit comprising instructions that, when executed by the processor, cause the processor to:
   capture a video of an object with a camera;
   record a movement trace of a pointer while capturing the video of the object, wherein the movement trace of the pointer outlines the object;
   generate a labeled image based at least on the captured video of the object and the recorded movement trace of the pointer, wherein the labeled image includes the object and a line that surrounds the object;
   the movement trace of the pointer lasting a period of time, and the captured video during the period of time including a plurality of image frames each having a corresponding trace point along the movement trace;
   select one image frame of the plurality of image frames of the captured video and adding a label box surrounding the object; and
   extract a label name from audio of a user.

12. The computing system of claim 11, wherein the camera is a part of an Augmented Reality (AR) device that is able to mark the movement trace of the pointer in the captured video.

13. The computing system of claim 11, wherein the memory unit further comprising instructions that, when executed by the processor, cause the processor to perform actions of:
   receiving a first command for starting a labeling mode,
   wherein recording the movement trace of the pointer is started in response to receiving the first command.

14. The computing system of claim 13, wherein the first command comprises at least one of: an audio, a gesture and an input on a button.

15. The computing system of claim 14, wherein the audio and/or the gesture is extracted from the video.

16. The computing system of claim 13, wherein the memory unit further comprising instructions that, when executed by the processor, cause the processor to perform actions of:
   receiving a second command for ending the labeling mode; and
   ceasing to record the movement trace of the pointer in response to receiving the second command.

17. A computer program product, comprising a computer readable storage medium having program instructions embodied therewith, the program instructions executable by a processor to cause the processor to perform actions of:
   capturing a video of an object with a camera;
      recording a movement trace of a pointer while capturing the video of the object, wherein the movement trace of the pointer outlines the object;
      generating a labeled image based at least on the captured video of the object and the recorded movement trace of the pointer, wherein the labeled image includes the object and a line that surrounds the object;
      the movement trace of the pointer lasting a period of time, and the captured video during the period of time including a plurality of image frames each having a corresponding trace point along the movement trace;
      selecting one image frame of the plurality of image frames of the captured video and adding a label box surrounding the object; and
      extracting a label name from audio of a user.

18. The computer program product of claim 17, wherein the program instructions further cause the processor to perform actions of:
   recording an audio signal including a label name corresponding to the object while capturing the video of the object; and
   extracting the label name from the audio signal,
   wherein the labeled image further includes the extracted label name corresponding to the object.

19. The computer program product of claim 17, wherein the captured video comprises a plurality of image frames, and wherein generating the labeled image comprises:
   extracting one or more key points of the object from the plurality of image frames;
   calculating a set of motion vectors based on changes of positions of the one or more key points among the plurality of image frames; and
   generating the line in the labeled image by adjusting trace points along the movement trace of the pointer in the plurality of image frames based on the set of motion vectors.

20. The computer program product of claim 17, wherein the program instructions further cause the processor to perform actions of:
   discretizing the line that surrounds the object to obtain a set of points on the line; and
   generating a minimum bounding rectangle for the set of points.

* * * * *